US009544922B2

(12) United States Patent
Hall

(10) Patent No.: US 9,544,922 B2
(45) Date of Patent: Jan. 10, 2017

(54) QUALITY OF SERVICE SCHEME FOR COLLISION-BASED WIRELESS NETWORKS

(75) Inventor: Robert J. Hall, Berkeley Heights, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 540 days.

(21) Appl. No.: 12/283,814

(22) Filed: Sep. 16, 2008

(65) Prior Publication Data
US 2010/0067451 A1    Mar. 18, 2010

(51) Int. Cl.
H04W 4/00      (2009.01)
H04W 72/00    (2009.01)
H04W 74/08    (2009.01)

(52) U.S. Cl.
CPC ............................. *H04W 74/0875* (2013.01)

(58) Field of Classification Search
USPC ............ 370/230.1, 230, 329, 232, 445, 448
See application file for complete search history.

(56) References Cited

U.S. PATENT DOCUMENTS

| | | | |
|---|---|---|---|
| 5,483,667 A | 1/1996 | Faruque | |
| 5,686,901 A * | 11/1997 | Chen ................... | H04W 88/185 340/7.43 |
| 6,015,344 A | 1/2000 | Kelly et al. | |
| 6,069,885 A | 5/2000 | Fong et al. | |
| 6,119,976 A | 9/2000 | Rogers | |
| 6,195,751 B1 | 2/2001 | Caronni et al. | |
| 6,304,556 B1 | 10/2001 | Haas | |
| 6,428,470 B1 | 8/2002 | Thompson | |
| 6,628,620 B1 | 9/2003 | Cain | |
| 6,781,971 B1 * | 8/2004 | Davis et al. .................. | 370/329 |
| 6,807,165 B2 | 10/2004 | Belcea | |
| 6,816,460 B1 | 11/2004 | Ahmed et al. | |

(Continued)

FOREIGN PATENT DOCUMENTS

WO    WO 02054671 A2 *    7/2002    ........... H04L 12/413
WO    WO 2007/016641 A2    2/2007

OTHER PUBLICATIONS

Hall et al., A Two-Level Quality of Service Scheme for Collision Based Mobile Ad Hoc Networks, Military Communications Conference, Oct. 2007. MILCOM 2007.*

(Continued)

*Primary Examiner* — Khaled Kassim
*Assistant Examiner* — Berhanu Belete
(74) *Attorney, Agent, or Firm* — Baker & Hostetler LLP

(57) ABSTRACT

A method for enabling different priority messages in a contention-based wireless network where units use a common channel. Relative to high priority messages, if the channel is not busy when a message is ready for transmission, then the message is transmitted immediately. When the channel is busy, the message is not transmitted until the channel becomes available and a selected back-off period (while the channel is available) expires. Back off periods are illustratively randomly selected by the units. Low priority messages are similarly not transmitted when the channel is busy, and additionally are not transmitted for a preselected pre-emption interval when the channel is available to high priority messages but not to low priority messages. Like with high priority messages, low priority messages that not transmitted when ready are held back a back-off period before they are transmitted.

18 Claims, 2 Drawing Sheets

(56) References Cited

U.S. PATENT DOCUMENTS

| | | | |
|---|---|---|---|
| 6,870,846 B2 | 3/2005 | Cain | |
| 6,873,613 B1 | 3/2005 | Dent | |
| 6,879,574 B2 | 4/2005 | Naghian et al. | |
| 6,909,706 B2 | 6/2005 | Wilmer et al. | |
| 6,937,602 B2 | 8/2005 | Whitehill et al. | |
| 6,940,832 B2 | 9/2005 | Saadawi et al. | |
| 6,954,435 B2 | 10/2005 | Billhartz et al. | |
| 6,958,986 B2 | 10/2005 | Cain | |
| 6,987,777 B1* | 1/2006 | Cain | H04L 29/06 370/412 |
| 7,027,822 B1 | 4/2006 | Hwang et al. | |
| 7,095,717 B2 | 8/2006 | Muniere | |
| 7,152,110 B2 | 12/2006 | Pierce | |
| 7,179,166 B1 | 2/2007 | Abbott | |
| 7,197,326 B2 | 3/2007 | Acampora | |
| 7,295,521 B2 | 11/2007 | Choi et al. | |
| 7,307,978 B2 | 12/2007 | Carlson | |
| 7,525,933 B1 | 4/2009 | Hall | |
| 7,540,028 B2 | 5/2009 | Ahmed et al. | |
| 7,573,858 B2 | 8/2009 | Roh et al. | |
| 7,613,467 B2 | 11/2009 | Fleischman | |
| 7,669,052 B2 | 2/2010 | Asano et al. | |
| 7,813,326 B1 | 10/2010 | Kelm et al. | |
| 7,864,168 B2 | 1/2011 | French | |
| 7,895,273 B1* | 2/2011 | Haldar | G06Q 10/10 370/229 |
| 7,917,169 B1 | 3/2011 | Hall | |
| 7,969,914 B1 | 6/2011 | Gerber | |
| 7,970,749 B2 | 6/2011 | Uhlir et al. | |
| 8,085,813 B2 | 12/2011 | Melick et al. | |
| 8,128,405 B2 | 3/2012 | Preston et al. | |
| 8,149,801 B2 | 4/2012 | Hall | |
| 8,149,846 B2* | 4/2012 | Mutnuru | H04L 12/5693 370/395.4 |
| 8,218,463 B2 | 7/2012 | Hall | |
| 8,248,367 B1 | 8/2012 | Barney et al. | |
| 8,332,544 B1 | 12/2012 | Ralls et al. | |
| 8,341,271 B2 | 12/2012 | Cho et al. | |
| 8,359,643 B2 | 1/2013 | Low et al. | |
| 8,376,857 B1 | 2/2013 | Shuman et al. | |
| 2001/0014094 A1 | 8/2001 | Epley | |
| 2002/0085582 A1* | 7/2002 | Kim | H04L 47/245 370/445 |
| 2002/0113872 A1 | 8/2002 | Kinjo | |
| 2002/0141454 A1* | 10/2002 | Muniere | 370/535 |
| 2002/0155846 A1 | 10/2002 | Shiraga | |
| 2002/0163912 A1 | 11/2002 | Carlson | |
| 2002/0167960 A1 | 11/2002 | Garcia-Luna-Aceves | |
| 2002/0169971 A1 | 11/2002 | Asano et al. | |
| 2003/0074413 A1 | 4/2003 | Nielsen et al. | |
| 2003/0103521 A1* | 6/2003 | Raphaeli | H04B 3/542 370/445 |
| 2003/0105956 A1 | 6/2003 | Ishiguro et al. | |
| 2003/0140149 A1* | 7/2003 | Marejka | H04L 63/02 709/229 |
| 2003/0145095 A1* | 7/2003 | Liu | H04L 12/40143 709/230 |
| 2003/0174690 A1 | 9/2003 | Benveniste | |
| 2003/0193394 A1 | 10/2003 | Lamb | |
| 2003/0235158 A1 | 12/2003 | Lee | |
| 2004/0013062 A1 | 1/2004 | Hino et al. | |
| 2004/0032847 A1 | 2/2004 | Cain | |
| 2004/0083385 A1 | 4/2004 | Ahmed et al. | |
| 2004/0100936 A1* | 5/2004 | Liu | H04W 74/085 370/345 |
| 2004/0121792 A1 | 6/2004 | Allen et al. | |
| 2004/0151144 A1* | 8/2004 | Benveniste | 370/336 |
| 2004/0185881 A1 | 9/2004 | Lee et al. | |
| 2004/0213270 A1 | 10/2004 | Su et al. | |
| 2004/0259563 A1 | 12/2004 | Morton et al. | |
| 2004/0264461 A1 | 12/2004 | Janneteau et al. | |
| 2005/0036448 A1* | 2/2005 | Leeuwen | H04L 47/6215 370/235 |
| 2005/0058151 A1 | 3/2005 | Yeh | |
| 2005/0086350 A1 | 4/2005 | Mai | |
| 2005/0096065 A1 | 5/2005 | Fleischman | |
| 2005/0129051 A1 | 6/2005 | Zhu et al. | |
| 2005/0152318 A1 | 7/2005 | Elbatt et al. | |
| 2005/0152378 A1 | 7/2005 | Bango et al. | |
| 2005/0243788 A1* | 11/2005 | Janczak | H04W 74/0866 370/341 |
| 2005/0254453 A1 | 11/2005 | Barneah | |
| 2005/0259597 A1 | 11/2005 | Benedetto | |
| 2005/0271057 A1 | 12/2005 | Kim et al. | |
| 2006/0013154 A1 | 1/2006 | Choi et al. | |
| 2006/0023677 A1 | 2/2006 | Labrador | |
| 2006/0084444 A1 | 4/2006 | Kossi et al. | |
| 2006/0126535 A1 | 6/2006 | Sherman | |
| 2006/0128349 A1 | 6/2006 | Yoon | |
| 2006/0148516 A1 | 7/2006 | Reddy et al. | |
| 2006/0153157 A1 | 7/2006 | Roh et al. | |
| 2006/0227787 A1 | 10/2006 | Furlong et al. | |
| 2007/0008925 A1 | 1/2007 | Dravida et al. | |
| 2007/0019591 A1* | 1/2007 | Chou et al. | 370/337 |
| 2007/0019594 A1 | 1/2007 | Perumal et al. | |
| 2007/0104096 A1 | 5/2007 | Ribera | |
| 2007/0110092 A1* | 5/2007 | Kangude et al. | 370/448 |
| 2007/0180533 A1 | 8/2007 | Ramaiah et al. | |
| 2007/0198731 A1 | 8/2007 | Li et al. | |
| 2007/0217346 A1 | 9/2007 | Zheng | |
| 2007/0259716 A1 | 11/2007 | Mattice et al. | |
| 2007/0259717 A1 | 11/2007 | Mattice et al. | |
| 2007/0263571 A1 | 11/2007 | Hermann et al. | |
| 2007/0265088 A1 | 11/2007 | Nakada et al. | |
| 2007/0265089 A1 | 11/2007 | Robarts et al. | |
| 2007/0266396 A1 | 11/2007 | Estermann | |
| 2007/0283001 A1 | 12/2007 | Spiess et al. | |
| 2007/0287437 A1 | 12/2007 | Cartmell | |
| 2008/0015024 A1 | 1/2008 | Mullen | |
| 2008/0039113 A1 | 2/2008 | Liu et al. | |
| 2008/0058099 A1 | 3/2008 | Schwartz et al. | |
| 2008/0080401 A1 | 4/2008 | Ribiere | |
| 2008/0144493 A1* | 6/2008 | Yeh | 370/230 |
| 2008/0145050 A1 | 6/2008 | Mayer et al. | |
| 2008/0147854 A1 | 6/2008 | Van Datta et al. | |
| 2008/0159236 A1 | 7/2008 | Ch'ng | |
| 2008/0163355 A1 | 7/2008 | Chu | |
| 2008/0186206 A1 | 8/2008 | Reumerman | |
| 2008/0192737 A1 | 8/2008 | Miyazaki | |
| 2008/0262928 A1 | 10/2008 | Michaelis | |
| 2008/0310439 A1* | 12/2008 | Gale | H04L 12/5693 370/412 |
| 2009/0005140 A1 | 1/2009 | Rose et al. | |
| 2009/0017913 A1 | 1/2009 | Bell et al. | |
| 2009/0030605 A1 | 1/2009 | Breed | |
| 2009/0041039 A1 | 2/2009 | Bear | |
| 2009/0045977 A1 | 2/2009 | Bai et al. | |
| 2009/0046628 A1 | 2/2009 | Hall | |
| 2009/0073912 A1 | 3/2009 | Bauchot et al. | |
| 2009/0122753 A1 | 5/2009 | Hughes et al. | |
| 2009/0138353 A1 | 5/2009 | Mendelson | |
| 2009/0175223 A1 | 7/2009 | Hall | |
| 2009/0201860 A1 | 8/2009 | Sherman et al. | |
| 2009/0207783 A1 | 8/2009 | Choi et al. | |
| 2009/0245518 A1 | 10/2009 | Bae et al. | |
| 2009/0248420 A1 | 10/2009 | Basir | |
| 2009/0292926 A1 | 11/2009 | Daskalopoulos et al. | |
| 2009/0298461 A1 | 12/2009 | O'Reilly | |
| 2009/0323579 A1 | 12/2009 | Bai et al. | |
| 2009/0325603 A1 | 12/2009 | Van Os et al. | |
| 2010/0008259 A1 | 1/2010 | Yoon et al. | |
| 2010/0029245 A1 | 2/2010 | Wood et al. | |
| 2010/0042601 A1 | 2/2010 | Kelley et al. | |
| 2010/0060480 A1 | 3/2010 | Bai et al. | |
| 2010/0064307 A1 | 3/2010 | Malhotra et al. | |
| 2010/0074234 A1 | 3/2010 | Banks et al. | |
| 2010/0082513 A1 | 4/2010 | Liu | |
| 2010/0128653 A1 | 5/2010 | Tateson | |
| 2010/0150129 A1 | 6/2010 | Jin et al. | |
| 2010/0162149 A1 | 6/2010 | Sheleheda et al. | |
| 2010/0169009 A1 | 7/2010 | Breed et al. | |
| 2010/0214987 A1 | 8/2010 | Mori | |
| 2010/0215040 A1 | 8/2010 | Kappler et al. | |

(56) References Cited

U.S. PATENT DOCUMENTS

| | | |
|---|---|---|
| 2010/0226342 A1 | 9/2010 | Colling et al. |
| 2010/0235633 A1 | 9/2010 | Asano et al. |
| 2010/0245124 A1 | 9/2010 | Bai et al. |
| 2010/0248618 A1 | 9/2010 | Bai et al. |
| 2010/0248843 A1 | 9/2010 | Karsten |
| 2010/0250106 A1 | 9/2010 | Bai et al. |
| 2010/0250346 A1 | 9/2010 | Bai et al. |
| 2010/0279776 A1 | 11/2010 | Hall |
| 2010/0287011 A1 | 11/2010 | Muchkaev |
| 2010/0304759 A1 | 12/2010 | Leppanen et al. |
| 2010/0329463 A1 | 12/2010 | Ratliff et al. |
| 2011/0002243 A1 | 1/2011 | Sherman et al. |
| 2011/0081973 A1 | 4/2011 | Hall |
| 2011/0102459 A1 | 5/2011 | Hall |
| 2011/0103302 A1 | 5/2011 | Hall |
| 2011/0105151 A1 | 5/2011 | Hall |
| 2011/0177829 A1 | 7/2011 | Platt et al. |
| 2011/0201369 A1 | 8/2011 | Kim et al. |
| 2011/0230202 A1 | 9/2011 | Wood et al. |
| 2011/0244887 A1 | 10/2011 | Dupray et al. |
| 2011/0299685 A1 | 12/2011 | Hall |
| 2012/0016940 A1 | 1/2012 | Hall |
| 2012/0058814 A1 | 3/2012 | Lutnick et al. |
| 2012/0079080 A1 | 3/2012 | Pishevar |
| 2012/0084364 A1 | 4/2012 | Sivavakeesar |
| 2012/0094770 A1 | 4/2012 | Hall |
| 2012/0108326 A1 | 5/2012 | Hall |
| 2012/0128010 A1 | 5/2012 | Huang et al. |
| 2012/0157210 A1 | 6/2012 | Hall |
| 2012/0329538 A1 | 12/2012 | Hall |
| 2013/0012231 A1 | 1/2013 | Hall |
| 2014/0082369 A1 | 3/2014 | Waclawsky et al. |
| 2014/0100027 A1 | 4/2014 | Harris et al. |

OTHER PUBLICATIONS

U.S. Appl. No. 13/875,735, filed May 2, 2013, Hall.
U.S. Appl. No. 13/890,423, filed May 9, 2013, Hall.
Nickles, Daniela, and Bernhard Mitschang. "On building location aware applications using an open platform based on the NEXUS Augmented World Model." Software and Systems Modeling 3.4 (2004): 303-313.
Nintendo, The computer game "Mario Kart DS", released in North America on Nov. 14, 2005, published by Nintendo, as evidenced by the game FAQ by Alex, downloaded from db.gamefaqs.com/portable/ds/file/mario_kart_ds_h.txt, with a game FAQ reported upload date of Jul. 15, 2007, p. 11.
Winkler, The computer game "GPS::Tron", as evidenced by the Ars Electronica organization archive document http://archive.aec.at!submission/2004/U19/1043/, where the document has an earliest archive.org verified publication date May 4, 2005, pp. 1-2.
Winkler, Additional date evidence for the Ars Electronica organization archive document archive.aec.at/submission/2004/U19/1043/, retrieved from http://web.archive.org/web/20050508084628/http://www.aec.at/en/archives/prix_archive/prix_project.asp?iProjectID=12899.
Aggarwal, Sudhir et al., "Accuracy in dead reckoning based distributed multi-player games", SIGCOMM '04 Workshops, (Proceedings of 3rd ACM SIGCOMM Workshop on Network and System Support for Games), Aug. 30-Sep. 3, 2004, Portland, Oregon, pp. 161-165.
Bjerver, Martin, "Player Behaviour in Pervasive Games—using the City as a Game Board in Botfighters", Master of Science Thesis, KTH Computer Science and Communication, Stockholm, Sweden, 2006.
bzflag(6):tank battle game—linux man page, Google date Feb. 1, 2001, downloaded from linux.die.net/man/6/bzflag.
de Souza e Silva, Adriana, "Alien revolt (2005-2007): A case study of the first location-based mobile game in Brazil", IEEE Technology and Society Magazine, Spring 2008, pp. 18-28.
Dialogic, "Adding location based services to existing architectures", Application Note: Location-Based Services, 9862-02, Oct. 2007, 14 pages, downloaded from www.dialogic.com/-/media/products/docs/signaling-and-ss7-components/9862_Add_Locationbased_Servs_an.pdf.
Gallagher, Sean, "Army prepares test of new wireless war game gear", Defense Systems, Jul. 7, 2008, downloaded from defensesystems.com/articles/2008/07/army-prepares-test-of-new-wireless-war-game-gear.aspx.
Hales, Jacek, "Ghost Recon: Advanced Warfighter Game Guide, [Mission 01] Contact!—Objective: Locate Ramirez with the Drone", 2007, downloaded from guides.gamepressure.com/ghostreconadvancedwarfighter/guide.asp?ID=986.
Hohfeld, Alexander, "In and out of reality: Janus-faced location awareness in ubiquitous games", Journal of Software, 2(6), Dec. 2007, 86-92.
Kim, Seong-Whan et al., "Kalman filter based dead reckoning algorithm for minimizing network traffic between mobile nodes in wireless Grid", Embedded and Ubiquitous Computing, Lecture Notes in Computer Science, 4096, 2006, 162-170.
Lindo, Wayne A. et al., "Network modeling and simulation in the OneTESS program", Fall Simulation Interoperability Workshop 2006, Orlando, Florida, USA, Sep. 10-15, 2006, 155ff.
MyCheats web page, "Ghost Recon: Advanced Warfighter Superguide, Reach Ramirez", (Jul. 19, 2006), downloaded from http://mycheats.1up.com/view/section/3139558/18404/ghost_recon_advanced_warfighter/pc.
Santos, Nuno et al., "Vector-field consistency for ad-hoc gaming", Middleware 2007, LNCS 4834, 2007, pp. 80-100.
Sotamaa, Olli, "All the world's a Botfighter Stage: Notes on location-based multi-user gaming", Proceedings of Computer Games and Digital Cultures Conference, Tampere University Press, 2002, pp. 35-44.
Various Authors, The Wikipedia page for the "snake" computer game, Nov. 3, 2008 version, Wikipedia.com, downloaded by the USPTO from http://en.wikipedia.org/w/index.php?title=Snake_(video_game)&oldid=249370716 on Oct. 4, 2012.
U.S. Appl. No. 13/327,472, filed Dec. 15, 2011, Hall.
U.S. Appl. No. 13/333,084, filed Dec. 21, 2011, Hall.
U.S. Appl. No. 13/683,025, filed Nov. 21, 2012, Panta.
U.S. Appl. No. 13/712,353, filed Dec. 12, 2012, Hall.
U.S. Appl. No. 14/279,441, filed May 16, 2014, Hall.
U.S. Appl. No. 12/837,168, filed Jul. 15, 2010, Hall.
U.S. Appl. No. 12/793,460, filed Jun. 3, 2010, Hall.
U.S. Appl. No. 12/914,886, filed Oct. 28, 2010, Hall.
U.S. Appl. No. 11/264,834, filed Nov. 1, 2005, Hall.
U.S. Appl. No. 12/969,386, filed Dec. 15, 2010, Hall.
U.S. Appl. No. 13/169,892, filed Jun. 27, 2011, Hall.
U.S. Appl. No. 13/169,829, filed Jun. 27, 2011, Hall.
U.S. Appl. No. 13/277,895, filed Oct. 20, 2011, Hall.
Ko et al., "Geocasting in Mobile Ad Hoc Networks: Location-based Multicast Algorithms", Technical Report TR-98-018 Texas A&M University, Sep. 1998.
Ko, et al., "Flooding-Based Geocasting Protocols for Mobile Ad Hoc Networks," Mobile Networks and Applications, Dec. 2002, 7, 471-480.
Hall, "RTEQ: Modeling and Validating Infinite-State Hard-Real-Time Systems", AT&T Labs Research, ASE 2007, Nov. 2007, 4 pages.
Hall, "Cheating Attacks and Resistance Techniques in Geogame Design," Proc. 2010 ACM FuturePlay Symposium, 2010, 82-89.
Hall, "An Improved Geocast for Mobile Ad Hoc Networking," IEEE Transactions on Mobile Computing, 2010, 1-14.
Illyas, "Body Personal, and Local Ad Hoc Wireless Networks", Chapter 1, CRC Press, 2003, 22 pages.
Liao et al., "GRID: A Fully Location-Aware Routing Protocol for Mobile Ad Hoc Networks", Telecommunication Systems, 2001, 18, pp. 1-26.
Shih et al., A Distributed Slots Reservation Protocol for QoS Routing on TDMA-based Mobile Ad Hoc Networks, 2004, (ICON 2004), Proceedings, 12th IEEE International Conference, Nov. 2004, 2, 660-664.

(56) References Cited

OTHER PUBLICATIONS

Shih et al., "CAPC: A Collision Avoidance Power Control MAC Protocol for Wireless Ad Hoc Networks", IEEE Communications Letters, Sep. 2005, 9(9), 859-861.
Tseng et al., "Fully Power-Aware and Location-Aware Protocols for Wireless Multi-hop Ad Hoc Networks", Proc. of IEEE Intl. Conference on Computer Communications and Networks (ICCCn), 2002, 6 pages.
Corbett, et al. "A Partitioned Power and Location Aware MAC Protocol for Mobile Ad Hoc Networks," Technical Report No. 553, University of Sydney, School of Information Technologies, Jul. 2004, 7 pages.
Panta, "GeoV2V: Vehicular Communications Using a Scalable Ad Hoc Geocast Protocol," AT&T Labs Research, 14 pages.
Balasubramaniam, et al. "Interactive WiFi Connectivity for Moving Vehicles," Proceedings of SIGCOMM, Aug. 17-22, 2008, 12 pages.
Maihofer, "A Survey of Geocast Routing Protocols," IEEE Communications Surveys, Jun. 2004, 32-42.
Das, et al., "SPAWN: A Swarming Protocol for Vehicular Ad-Hoc Wireless Networks," Proceedings of 1$^{st}$ ACM Vanet, Oct. 2004, 2 pages.
German Aerospace Center, Simulation of Urban Mobility, 2010, http://sumasourceforge.net, 1 page.
Gupta, et al., "The Capacity of Wireless Networks," IEEE Transactions on Information Theory, 46(2), Mar. 2000, 17 pages.
Hadaller, et al., "Vehicular Opportunistic Communication Under the Microscope," Proceedings of MobiSys, Jun. 11-14, 2007, 206-219.
Heissenbüttel, et al., "BLR: Beacon-Less Routing Algorithm for Mobile Ad-Hoc Networks," Elsevier's Computer Communications Journal, 27, 2003, 15 pages.
Hall, et al., "A Tiered Geocast Protocol for Long Range Mobile Ad Hoc Networking," Proceedings of the 2006 IEEE Military Communications Conf., 2006, 8 pages.
Hull, et al., "CarTel: A Distributed Mobile Sensor Computing System," Proceedings of ACM SenSys, Nov. 2006, 14 pages.
Eriksson, et al., "Cabernet: Vehicular Content Delivery Using WiFi," Proceedings of Mobicom, Sep. 2008, 12 pages.
Karp, et al, "GPSR: Greedy Perimeter Stateless Routing for Wireless Networks," Proceedings of Mobicom, 2000, ACM 2000, 12 pages.
Kuhn, et al., "Geometric Ad-Hoc Routing: Of Theory and Practice," Proc. 2003 Symposium on Principles of Distributed Computing, ACM 2003, 10 pages.
Lee, et al., "CarTorrent: A Bit-Torrent System for Vehicular Ad-Hoc Networks," Mobile Networking for Vehicular Environments, Sep. 2007, 6 pages.
Lee, et al., "Efficient Geographic Routing in Multihop Wireless Networks," Proc. MobiHoc 2005, ACM, 2005, 12 pages.
Ni, et al., "The Broadcast Storm Problem in a Mobile Ad Hoc Network," Proceedings of the 5$^{th}$ Annual ACM/IEEE International Conference on Mobile Computing and Networking, ACM, 1999, 151-162.
Manvi, et al., "Performance Analysis of AODV, DSR, and Swarm Intelligence Routing Protocols in Vehicular Ad Hoc Network Environment," Proceedings of IEEE Future Computer and Communications, Apr. 2009, 21-25.
Niculescu, et al., "Trajectory Based Forwarding and Its Applications," Proc. Mobicom 2003, ACM, 2003, 13 pages.
Ns-2, "The Network Simulator," 2010, http://is.edu/nsnam/ns, 2 pages.
Schwingenschlogl, "Geocast Enhancements of AODV for Vehicular Networks," ACM Sigmobile Mobile Computing and Communications Review, Jun. 2002, 18 pages.
Shevade, et al., "Enabling High-Bandwidth Vehicular Content Distribution," Proceedings of CoNEXT 2010, Nov. 30-Dec. 3, 2010, 12 pages.
Yassein, et al., "Performance Analysis of Adjusted Probabilistic Broadcasting in Mobile Ad Hoc Networks," Proc. 11$^{th}$ Intl. Conf. on Parallel and Distributed Systems Workshops, 2005, 27 pages.
Zahn, et al., "Feasibility of Content Dissemination Between Devices in Moving Vehicles," Proceedings of CoNEXT 2009, Dec. 1-4, 2009, 11 pages.
Zorzi, et al., "Geographic Random Forwarding (GeRaF) for Ad Hoc and Sensor Networks: Multihop Peformance," IEEE Transactions on Mobile Computing, Dec. 2003, 11 pages.
Social + Gaming—SWiK: http://swik.net/social+ gaming.
http://askville.amazon.com/Wii-games-play-Internet-Family/AnswerViewer.do?requestId=6796582(2007).
Schutzberg, "Phone-based GPS-based Games: Missing Pieces"; http://www.directionsmag.com/articlephp?article_id=939 (Aug. 17, 2005).
"Boost Mobile Introduces First Location-based, GPS games in US" http://www.physorg.com/news5824.html (Aug. 16, 2005).
"Sony bigwig hints at GPS-enabled PSP games"; http:www.vespacious.com/sony-bigwig-hints-at-gps-enabled-psp-games.html (Dec. 22, 2008).
Steve:"GPS-enabled Cell Phone Games" http://www.strangenewproducts.com/2005/08/gps-enabled-cell-phone-games.html (Aug. 15, 2005).
Location-Enabled Mobile Gaming; http://www.nn4d.com/site/global/market/affiliate_sites/lbsglobe/lbsapplications/mobilegaming.jsp (2007).

* cited by examiner

QUALITY OF SERVICE SCHEME FOR COLLISION-BASED WIRELESS NETWORKS

BACKGROUND OF THE INVENTION

This relates to transmission protocols and more particularly, to a protocol for transmitting messages in a network that employs a collision-based protocol. The network may be an ad hoc network.

For various reasons, mobile ad-hoc networks are best served by a collision-based architecture, and at least in some applications it is desirable to employ a protocol with a two-level QoS scheme. In at least one form of collision-based networks, a unit that wishes to transmit listens to the common channel over which other units might be transmitting and when it has a message (e.g., a packet) to transmit and it determines that the channel is available, it proceeds to transmit the message. When the unit determines that the channel is unavailable, it obtains a delay measure (back-off interval), which typically is a random value within a predetermined range, waits for a time corresponding to the obtained back-off interval, and then again determines whether the channel is available. If so, the unit transmits the message. Otherwise, the unit again waits the same (or different) back-off interval and tries again.

One well known collision-based approach employs the 802.11 protocol. While the 802.11 protocol provides a QoS facility, the ability to have different QoS levels needs base stations to administer the protocol, but use of base stations is generally disfavored in mobile ad hoc networks because it is desirable to confer on these networks a highly alterable constitution. The desirable approach, therefore, is one that does not require the use of base stations.

SUMMARY OF THE INVENTION

An advance in the art is obtained by employing a collision-based protocol that is suitable for wireless networks, such as the 802.11 which employs CSMA/CA (carrier sense multiple access—collision avoidance), and augmenting the protocol to the extent of modifying the operation of a station that wishes to transmit a low priority message. Thus, in accordance with a known protocol, a unit that wishes to transmit a message and finds the channel unavailable obtains (or chooses) a back-off interval, and once the channel becomes available begins to decrement the interval. The decrementing is suspended whenever it is detected that the channel is unavailable. Once the back-off interval expires the unit sends the message. This insures that the unit refrains from transmitting while the channel is busy. In accord with the principles disclosed herein, for high priority messages the protocol is as described above. For low priority messages the unit is caused to refrain from transmitting during the back-off interval and, additionally, the unit is caused to refrain from transmitting for a preselected pre-emption interval while the channel is not busy. During the pre-emption interval high priority messages can access the channel without contention from low priority messages.

Embodiments that employ no back-off interval at all are also possible.

DETAILED DESCRIPTION

Figure 1:
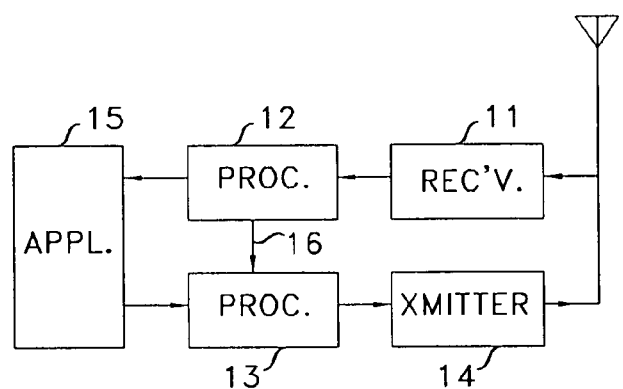
FIG. 1 is high level block diagram of a unit that operates in a wireless contention-based network.

In a contention-based network it is possible to have units that inherently only have low priority outgoing messages, high priority outgoing messages, or both low priority and high priority messages. FIG. 1 is a high level block diagram of a unit operating in a contention-based wireless network that has messages of only one priority level. Element 11 is a receiver, which applies received signals to processor 12. Processor 12 constructs received messages into a predetermined format and sends them to application module 15, and continually provides a "channel busy" signal, $CB(t)$, that indicates whether the channel is busy; i.e., $CB(t)=1$ means that at time t the channel is busy. This channel-busy indication signal on line 16 is applied to processor 13, which is also sensitive to outgoing messages that are provided to processor 13 by application module 15. Processor 13 determines when a provided outgoing message is applied to transmitter module 14.

As indicated above, low priority messages are precluded from being transmitted during a preselected pre-emption interval even when the channel is not busy. This leads to the situation that when a low priority message is ready to be transmitted and the channel is not busy it is necessary to know whether the not-busy channel is in the midst of the LPPI and, hence, "busy" as far as low priority messages are concerned. In accord with the illustrative embodiment disclosed below, the LPPI follows immediately after the channel ceases to be busy, and that makes it easy to determine whether the channel is in the midst of the LPPI. Specifically, the channel enters the LPPI at time t if $CB(t)=0$ and $CB(t-LPPI)=1$.

Figure 2:
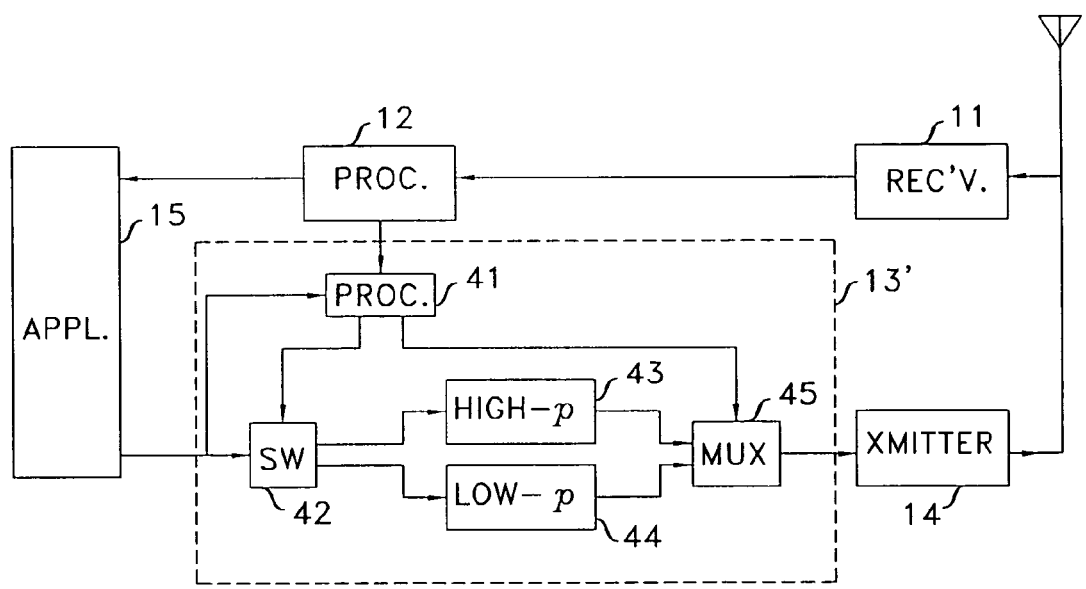
FIG. 2 is a block diagram of a unit that is constructed to handle outgoing messages of both low priority and high priority.

The wireless unit of FIG. 1 may be one that transmits only high priority outgoing messages, or low priority outgoing messages. FIG. 2 is a block diagram of a unit that sometimes creates high priority outgoing messages and other times creates low priority outgoing messages.

In accord with the illustrative embodiment presented in FIG. 2, elements 11, 12, 15 and 14 are the same as in FIG. 1, and element 13 of FIG. 1 is replaced with element 13'. Illustratively, each message that is provided by application 15 to element 13' contains a field that identifies the message as a low priority message or a high priority message. Within element 13', the provided message is applied to processor 41 which parses the message and identifies the priority of the message. Based on this parsing, processor 41 controls switch 42 to send the provided message either to high-priority queue 43 or to low-priority queue 44. Correspondingly, processor 41 updates an internal count of the number of messages in queue 43 and queue 44. Queues 43 and 44 are first-in-first-out (FIFO) queues, where the messages are stored at a tail of the queue and messages are taken out at a head of the queue. A message is said to be "popped" out of the queue when it is removed from the head of the queue.

In accord with one illustrative embodiment, messages in queue 43 always take precedence over messages in queue 44. That is, when a message is queued in queue 43, processor 41 executes a process for high priority messages, and only when queue 43 is empty does processor execute a process for low priority messages. While in the course of executing the process for low priority messages, if a high priority message arrives, the executing process is suspended and the process for high priority messages is executed.

Figure 3:
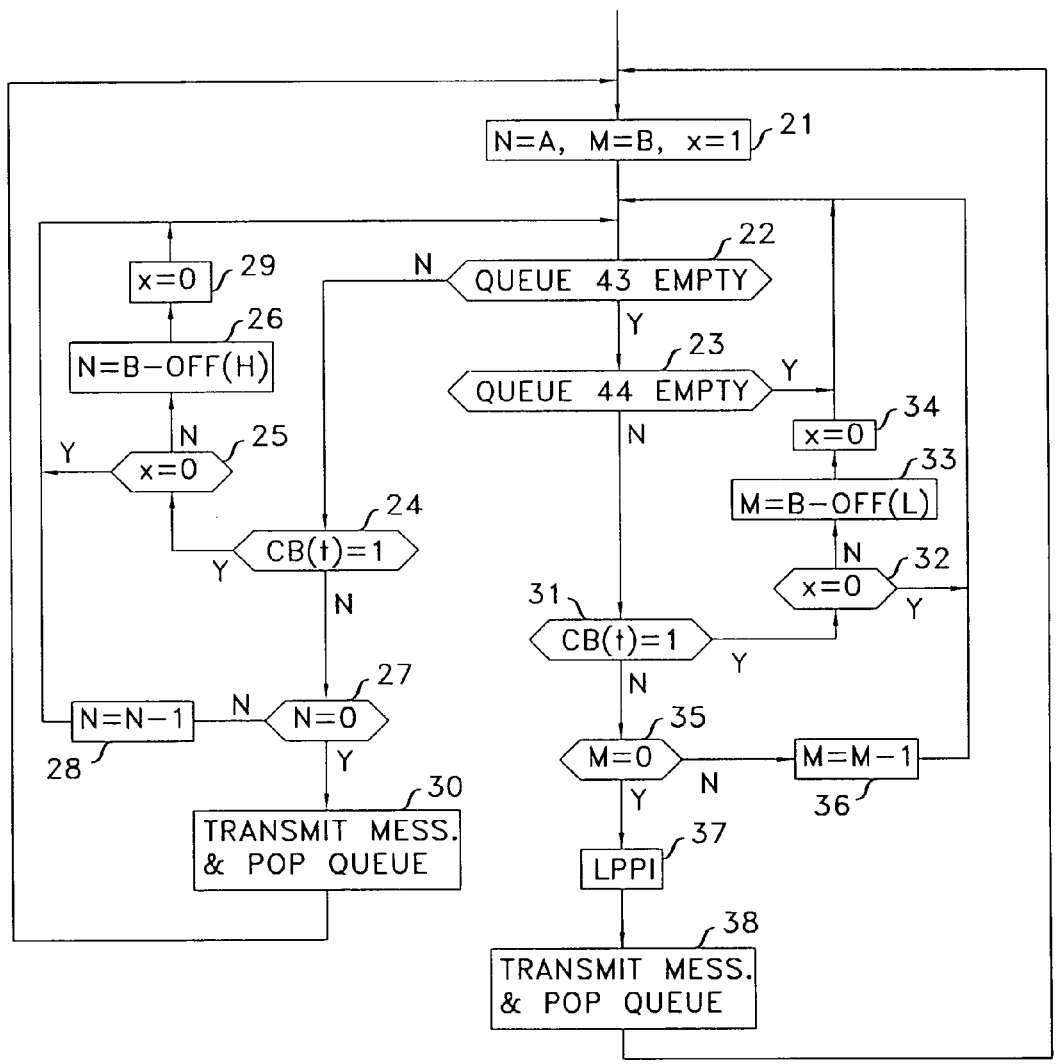
FIG. 3 is a flow diagram of the process encompassed by processor 41 in FIG. 2.

FIG. 3 is a flow diagram of an illustrative process in accord with the principles disclosed herein that is executed by processor 41 or the FIG. 2 unit. Although embodiments that employ no back-off at all can benefit from the principles of this invention, the FIG. 3 flow diagram assumes that back-off is employed. The simple modification of removing some steps would results in a method for embodiments that do not use back-off.

Accordingly, processor 41 includes a counter N that is used for counting down a back-off interval for high priority messages, a counter M that is used for counting down a back-off interval for low priority messages and a counter L for counting down the LPPI. Counters N and M are set, respectively, to A and B in step 21. Values A and B may both be 0, may be equal to each other but greater than zero, and may also be different from each other. Step 21 also sets back-off flag x to 1.

In applications where a broadcast by one unit elicits a response from a plurality of units, it is advantageous for A or B, or both, to not be equal to 0 (depending on the kind of priority the response message has), because should the channel be not busy it is not desirable for those units to attempt to transmit the response message essentially concurrently. It is advantageous, however, or the values of one unit to be different from the corresponding values of another unit. This may be arranged by each unit choosing A and B randomly (within a given range, of course) or by means of some other mechanism.

From step 21 control passes to step 22, which determines whether queue 43 is empty. If it is, meaning that there are no high priority outgoing messages ready for transmission, control passes to step 23, which determines whether queue 44 is empty. If it is, meaning that there are no low priority outgoing messages ready for transmission, control returns to step 22. This looping through steps 22 and 23 continues until a message is stored in one of the queues.

When, for example, a high priority message arrives and it is stored in queue 43, control passes from step 22 to step 24. Step 24 determines whether CB(t) is true. If not, meaning that the channel is not busy, control passes to step 27. Step 27 determines whether N=0, and on the first pass through step 24 step 27 finds that N is equal to A. In embodiments where A, and hence the initial value of N, is greater than 0, control passes to step 28 where N is decremented, and control returns to step 22. When N is 0, control passes to step 30. Step 30 pops the message from queue 43, applies it to multiplexer 45, directs the message to transmitter element 14, and element 14 transmits the message. Control then returns to step 21.

When step 24 concludes that the channel is busy, control passes to step 25. Step 25 determines whether flag x is equal to 1, and if so, passes control to step 26 which sets counter N to the "busy channel back-off interval for high priority messages," B-OFF(H), selected for the unit, and passes control to step 29. Step 29 sets flag x to 0, and returns control to step 22. In embodiments where A is greater than 0 the "channel busy back-off interval" may be equal to A, or it may have some other value. As in the prior art, the value of B-OFF(H) may be selected randomly in order to diminish possible collisions with other units.

The process cycles through steps 22, 24 and 25, as long as the channel is busy. When the channel becomes available, step 24 passes control to step 27; and from step 27, as disclosed above, control eventually passes to step 30 where the message is transmitted.

It may be appreciated that while the channel is available and the FIG. 3 process is waiting for its back-off interval to expire (decrementing counter N toward 0 in step 28), the channel may become busy. In such an event, the process again cycles through steps 22, 24 and 25, as described above, keeping the value of N unchanged.

When a low priority message arrives (when Queue 43 is empty), it is stored in queue 44, and control passes from step 23 to step 31. Step 31 determines whether the channel is busy.

When step 31 determines that the channel is busy, control passes to step 32. Step 32 determines whether flag x is 0. If not, control passes to step 33, which sets counter M to the unit's "busy channel back-off interval for low priority messages," B-OFF(L). Control then passes to step 34, which sets flag x to 0 and returns control to step 22. When step 32 finds that flag x is 0. control returns to step 22 directly. Thus, when a low priority message is ready to be transmitted and there is no high priority message that is ready to be transmitted, while the channel is busy the process cycles through steps 22, 23, 31 and 32 keeping the value of counter M unchanged.

When step 31 determines that the channel is not busy, control passes to step 35, which determines whether M is greater than 0. If so, control passes to step 36 where M is decremented, and control returns to step 22.

When step 35 determines that M=0, control passes to step 37 where the LPPI is handled. In accord with one approach whenever step 37 is reached, the full value of the LPPI is tacked on. That is, the value of the LPPI is represented by a counter, L, and counter L is set to a chosen value upon entry into step 37; i.e., whenever it is detected that the channel switched from being busy to being not busy. Thereafter, counter L is decremented but only if the channel is not busy. When counter L reaches 0 it is concluded that the LPPI expired. In accord with another approach, upon entry into step 37, if the value of counter L is 0 then it is set to the aforementioned chosen value. Otherwise, it is left unchanged. In this approach when the channel is busy, the decrementing of the LPPI counter is also suspended, but when the channel becomes not busy, the decrementing of the counter resumes. Again, when counter reaches 0 it is concluded that the LPPI expired.

Once the LPPI expires, control passes to step 38. Step 38 pops the message from queue 44, applies it to multiplexer 45, directs the message to transmitter element 14, and element 14 transmits the message. Control then returns to step 21.

It may be appreciated that while the channel is available, a low priority message is present in queue 44, queue 43 is empty, and the FIG. 3 process is waiting for the back-off interval to expire (decrementing counter M toward 0) and then for the LPPI to expire (decrementing counter L toward 0), the channel may become busy. In such an event, the process cycles through steps 22, 23, 31 and 32, as described above, keeping the value of M unchanged. If a high priority message enters queue 43 at such a time, control passes from step 22 to step 24, and the FIG. 3 process operates as disclosed above relative to high priority processes. The value of M remains unchanged while the process handles the high priority messages in queue 43. When that high priority message is transmitted and queue 43 is empty, the FIG. 3 process returns to decrementing M once it again finds the channel not busy.

There may be a need in some applications to have an interframe interval that follows immediately after the channel becomes available. This is akin to having another pre-emption interval. A slight modification to the FIG. 3 method can provide for interframe intervals by simply increasing the LPPI value to which counter L is set in step 37, and by providing another, short pre-emption interval between steps 27 and 30.

It should be noted that whereas the LPPI is a time interval, the FIG. 3 method employs a counter to count-down the LPPI, and the counting down is a function of the clock that propels the FIG. 3 method, and the time that it takes to execute the cycle represented by steps 22, 23, 29, 30, 32, and 33. Clearly, there is a linear relationship between the clock, the cycle times, and the LPPI, so a count stands in the shoes of a time interval. If the clock is very fast and the desired granularity of the LPPI is not very fine, a delay man be included in, for example, step 31, to reduce the number of cycles that are required to count-down the LPPI.

The above disclosed the principles of this invention by means of an illustrative example, but it should be realized that a person skilled in the art can make various modifications and improvements that are explicitly disclosed herein in detail but are nevertheless within the spirit of the disclosure and the scope of the invention claimed below.

To give one example, in some embodiments it is possible to do without the "by channel back-off interval" for low priority messages, or high priority messages, or for both. In embodiments step 26, or step 31, or both, are not necessary. That is, when no back-off interval is employed, a high priority message is sent as soon as the channel is available, and a low priority message is sent as soon as the channel is available and the LPPI expires.

Another example is embodiments can have more than two levels of message priorities. Such embodiments are effected by providing different back-off intervals for the different priorities.

The invention claimed is:

1. A method of transmitting over a channel associated with a wireless unit, the method comprising:
    determining, by a processor, a message to be one of a first priority message or a second priority message;
    upon a determination that the message is the first priority message in a first priority message queue, determining whether the second priority message is pending in a second priority message queue to be transmitted over the channel;
    analyzing a counter indicative of a number of second priority messages in the second priority message queue to determine whether the second priority message is pending in the second priority message queue, wherein the counter is decremented upon transmission of the second priority message;
    upon a determination that the second priority message is pending in the second priority message queue based on the analyzing, suspending transmission of the first priority message, until no second priority messages are pending in the second priority message queue;
    upon a determination that no second priority messages are pending in the second priority message queue, determining whether the channel is busy;
    upon a determination that the channel is busy, waiting until the channel becomes not busy;
    upon the channel being not busy and the determination that no second priority messages are pending in the second priority message queue, suspending, for a predetermined amount of time, transmission of the first priority message; and
    upon a determination that the channel is not busy, and expiration of the predetermined amount of time, transmitting the message over the channel.

2. The method of claim 1, wherein the predetermined amount of time advances in time toward expiration while the channel is not busy.

3. The method of claim 1, wherein:
    the predetermined amount of time expires when the channel is not busy; and
    the transmitting of the message commences immediately thereafter, while the channel is not busy.

4. The method of claim 1, further comprising:
    initializing a counter to a predetermined counter value, wherein suspending the transmission of the first priority message comprises decrementing the counter value until the counter value is equal to zero.

5. The method of claim 1, further comprising:
    initializing a backoff counter to a predetermined counter value;
    upon the channel being not busy and the determination that no second priority messages are pending in the second priority message queue, decrementing the backoff counter; and
    upon the channel being not busy, a determination that the backoff counter equals zero, and the determination that no second priority messages are pending in the second priority message queue, suspending, for a first predetermined amount of time, transmission of the first priority message.

6. The method of claim 5, wherein the predetermined counter value is selected randomly.

7. An apparatus comprising:
    a processor and;
    memory coupled to the processor, the memory comprising executable instructions that when executed by the processor cause the processor to effectuate operations comprising:
    determining a message to be one of a first priority message or a second priority message;
    upon a determination that the message is the first priority message in a first priority message gueue, determining whether the second priority message is pending in a second priority message queue to be transmitted over a channel;
    analyzing a counter indicative of a number of second priority messages in the second priority message queue to determine whether the second priority message is pending in the second priority message queue, wherein the counter is decremented upon transmission of the second priority message;
    upon a determination that the second priority message is pending in the second priority message queue based on the analyzing, suspending transmission of the first priority message, until no second priority messages are pending in the second priority message queue;
    upon a determination that no second priority messages are pending in the second priority message queue, determining whether the channel is busy;
    upon a determination that the channel is busy, waiting until the channel becomes not busy;
    upon the channel being not busy and the determination that no second priority messages are pending in the second priority message queue, suspending, for a predetermined amount of time, transmission of the first priority message; and
    upon a determination that the channel is not busy, and expiration of the predetermined amount of time, transmitting the message over the channel.

8. The apparatus of claim 7, wherein the predetermined amount of time advances in time toward expiration while the channel is not busy.

9. The apparatus of claim 7, wherein:
the predetermined amount of time expires when the channel is not busy; and the transmitting of the message commences immediately thereafter, while the channel is not busy.

10. The apparatus of claim 7, the operations further comprising:
initializing a counter to a predetermined counter value, wherein suspending the transmission of the first priority message comprises decrementing the counter value until the counter value is equal to zero.

11. The apparatus of claim 7, the operations further comprising:
initializing a backoff counter to a predetermined counter value;
upon the channel being not busy and the determination that no second priority messages are pending in the second priority message queue, decrementing the backoff counter; and
upon the channel being not busy, a determination that the backoff counter equals zero, and the determination that no second priority messages are pending in the second priority message queue, suspending, for a first predetermined amount of time, transmission of the first priority message.

12. The apparatus of claim 11, wherein the predetermined counter value is selected randomly.

13. A memory device comprising executable instructions that when executed by a processor cause the processor to effectuate operations comprising:
determining a message to be one of a first priority message or a second priority message;
upon a determination that the message is the first priority message in a first priority message queue, determining whether the second priority message is pending in a second priority message queue to be transmitted over a channel;
analyzing a counter indicative of a number of second priority messages in the second priority message queue to determine whether the second priority message is pending in the second priority message queue, wherein the counter is decremented upon transmission of the second priority message;
upon a determination that the second priority message is pending in the second priority message queue based on the analyzing, suspending transmission of the first priority message, until no second priority messages are pending in the second priority message queue;
upon a determination that no second priority messages are pending in the second priority message queue, determining whether the channel is busy;
upon a determination that the channel is busy, waiting until the channel becomes not busy;
upon the channel being not busy and the determination that no second priority messages are pending in the second priority message queue, suspending, for a predetermined amount of time, transmission of the first priority message; and
upon a determination that the channel is not busy, and expiration of the predetermined amount of time, transmitting the message over the channel.

14. The memory device of claim 13, wherein the predetermined amount of time advances in time toward expiration while the channel is not busy.

15. The memory device of claim 13, wherein:
the predetermined amount of time expires when the channel is not busy; and the transmitting of the message commences immediately thereafter, while the channel is not busy.

16. The memory device of claim 13, further comprising:
analyzing a counter indicative of a number of second priority messages in the second priority message queue to determine whether a second priority message is pending in the second priority message queue; and
upon a determination, based on the analyzing, that a second priority message is pending in the second priority message queue:
transmitting a second priority message at a head of the first queue; and
decrementing the counter.

17. The memory device of claim 13, further comprising:
initializing a counter to a predetermined counter value, wherein suspending the transmission of the first priority message comprises decrementing the counter value until the counter value is equal to zero.

18. The memory device of claim 13, the operations further comprising:
initializing a backoff counter to a predetermined counter value;
upon the channel being not busy and the determination that no second priority messages are pending in the second priority message queue, decrementing the backoff counter; and
upon the channel being not busy, a determination that the backoff counter equals zero, and the determination that no second priority messages are pending in the second priority message queue, suspending, for a first predetermined amount of time, transmission of the first priority message.

* * * * *